United States Patent [19]

Porter

[11] 4,245,153
[45] Jan. 13, 1981

[54] SUN TRACKING SYSTEM FOR SOLAR COLLECTOR

[76] Inventor: David R. Porter, 2116 E. Dunbar Dr., Tempe, Ariz. 85282

[21] Appl. No.: 18,947

[22] Filed: Mar. 9, 1979

[51] Int. Cl.³ .............................................. G01J 1/20
[52] U.S. Cl. ............................................. 250/203 R
[58] Field of Search ............... 250/203 R; 126/270, 126/271; 356/141, 152

[56] References Cited
U.S. PATENT DOCUMENTS

| | | | |
|---|---|---|---|
| 2,913,583 | 11/1959 | Regnier et al. | 250/203 R |
| 4,108,154 | 8/1978 | Nelson | 250/203 R X |

*Primary Examiner*—David C. Nelms
*Assistant Examiner*—Darwin R. Hostetter
*Attorney, Agent, or Firm*—Warren F. B. Lindsley

[57] ABSTRACT

A solar collector platform movable about two mutually perpendicular axes through the action of two drive motors controlled by a simple and inexpensive light sensing control circuit.

3 Claims, 5 Drawing Figures

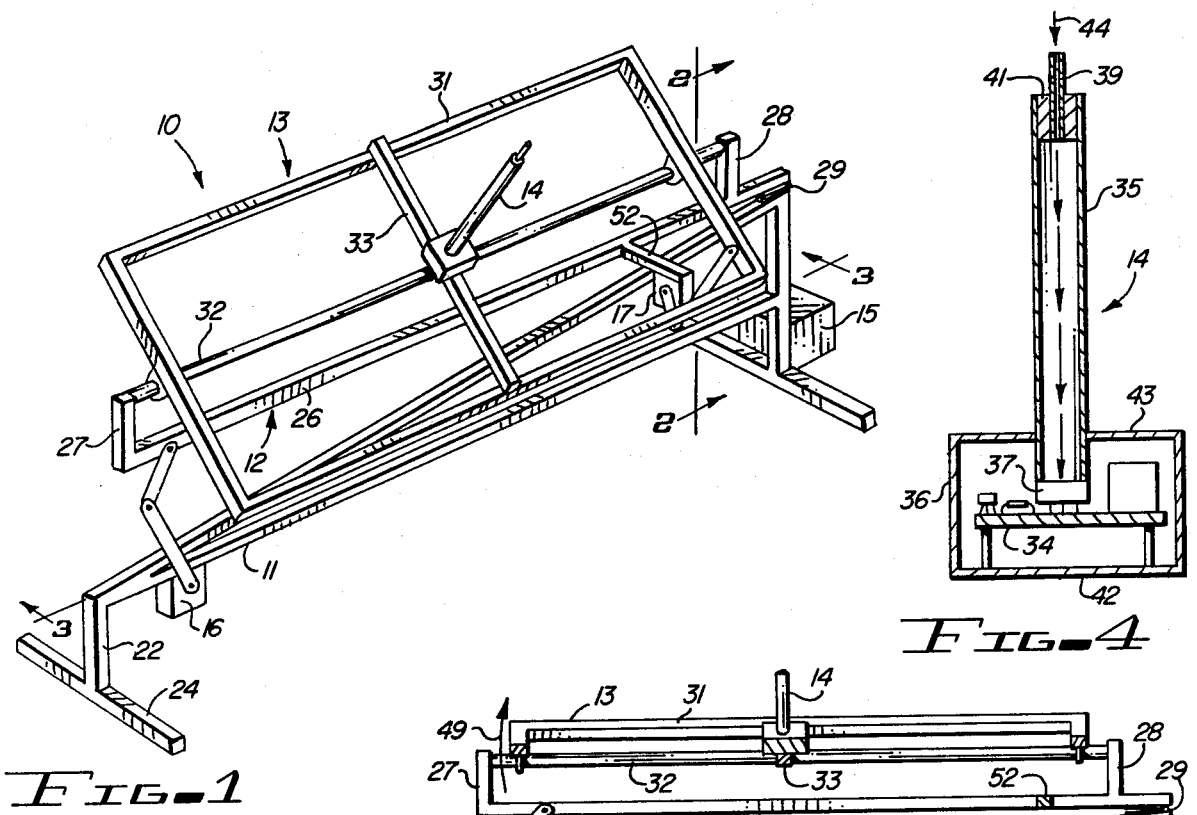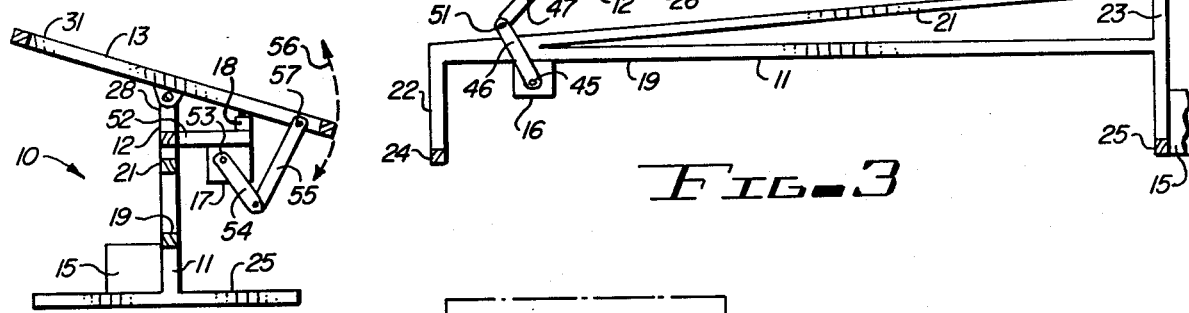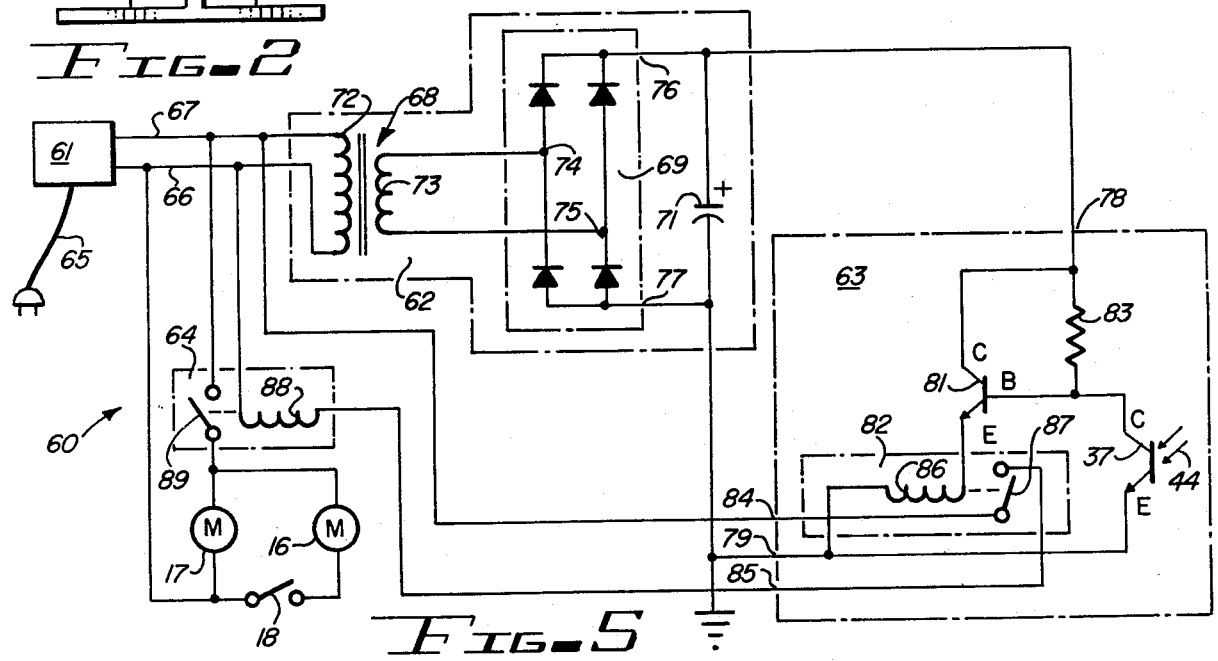

SUN TRACKING SYSTEM FOR SOLAR COLLECTOR

BACKGROUND OF THE INVENTION

The rapid expansion of the world's population coupled with the accelerated technological development of large sectors of the world has produced a dramatic increase in the demand for energy in all forms including fuels and electricity for heating, lighting, transportation and manufacturing processes. The construction of hydroelectric facilities and the development of fossil fuel resources has continued at a rapid rate, but it becomes increasingly evident for a number of reasons that these efforts are inadequate to keep pace with the demands of the growing population.

Until recently, the development of solar energy collectors has been associated for the most part with programs involving military and space applications while only limited attention has been given to broad consumer use. As a result, there is a great potential for improvements in existing collection devices that will result in reduced manufacturing costs and improved thermal efficiencies.

One such device knwon as a flat plate collector is made of metal and glass with one or more layers of glass laid over a blackened metal plate. Air spaces are provided between the layers of glass and air or water passes through tubes under the metal plate to remove the collected thermal energy. The layers of glass in cooperation with the blackened metal plate act as a heat trap, letting in the sun's rays but keeping most of the heat from escaping again.

Parabolic reflectors have also been utilized to concentrate the rays of the sun on a pipe that is positioned at the focal point of the reflector. The collected energy in the form of heat is transferred to air or liquid carried by the pipe.

For the effective and efficient operation of either of the above described collectors, it is necessary or at least desirable that the collector be trained at all times in the direction of the sun. Variations of equipment intended to meet such purposes are described in U.S. Pat. Nos. 1,162,505; 2,803,591; 3,118,437 and 4,000,734. Most systems of this type incorporate thereinto elaborate systems of gears and racks or other means to shift or otherwise change the positions of the exchange or collector unit so that its position relative to the source of heat remains approximately constant.

U.S. Pat. Nos. 3,421,004 and 3,996,460 disclose solar tracking devices employing photo sensors located within light vanes and a shadow box respectively. U.S. Pat. No. 3,857,638 discloses a protective tube to guide a light beam from an emitting source to a detector.

While such prior art inventions do suggest workable approaches for the realization of the important objectives involved, the particular implementations described in these patents have in general fallen short of what is required in a low-cost and practical system.

More specifically, what is needed to render solar energy collection economically feasible for use by the homeowner or small businessman is an extremely simple mechanically and electrically mechanism for the support and directional control of the collector unit.

SUMMARY OF THE INVENTION

In accordance with the invention claimed, an improved solar collector platform is provided complete with control and actuating mechanisms which rotate the platform about two mutually perpendicular axes, thereby causing the platform to be directed at all times toward the position of the sun.

It is, therefore, one object of this invention to provide an improved mounting platform for a relatively small and inexpensive solar collector unit.

Another object of this invention is to provide such a platform in a form which permits it to be rotated about two mutually perpendicular axes and which thereby renders the platform maneuverable horizontally and vertically toward all positions of the sun throughout the daylight hours and through the seasons of the year.

A further object of this invention is to provide an automatic electronic and electro-mechanical control mechanism with a capability for effecting the desired instantaneous positioning of the platform relative to the sun.

A still further object of this invention is to provide such mechanical arrangements and the associated electronic and electro-mechanical means in the simplest possible forms so that the initial as well as maintenance costs may be minimized.

Further objects and advantages of the invention will become apparent as the following description proceeds and the features of novelty which characterize the invention will be pointed out with particularity in the claims annexed to and forming a part of this specification.

BRIEF DESCRIPTION OF THE DRAWINGS

The present invention may be more readily described with reference to the accompanying drawing, in which:

FIG. 1 is a perspective view of the sun tracking platform and control system of the inventon;

FIG. 2 is a cross-sectional end view of the apparatus of FIG. 1 as seen along line 2—2 of that Figure.

FIG. 3 is a cross-sectional side view of the apparatus of FIG. 1 as seen along line 3—3 of that Figure;

FIG. 4 is an enlarged cross-sectional side view of the optical sensor element incorporated in the apparatus of FIGS. 1-3; and FIG. 5 is a schematic diagram showing the electronic and electrical control system incorporated in the apparatus of FIGS. 1-4.

DESCRIPTION OF THE PREFERRED EMBODIMENT

Referring more particularly to the drawing by characters of reference, FIGS. 1-5 disclose a sun tracking solar collector platform 10 comprising a stationary base 11, a secondary support 12 pivotally mounted to base 11, a collector mounting frame 13 rotatably mounted to secondary support 12, an optical sensor element 14 mounted on the frame 13, an electrical control box 15, actuating motors 16 and 17 and a motor control swtich 18.

Base 11 comprises a horizontal member 19, an inclined member 21, two vertical members 22 and 23 and two horizontal feet 24 and 25. Vertical members 22 and 23 are perpendicularly secured, respectively, to the centers of feet 24 and 25. Member 23 is somewhat longer than member 22. Horizontal member 19 has one end secured to the top of member 22 and its other end secured to the side of member 23 at an elevation equal to the height of member 22. Inclined member 21 has one end secured with the one end of member 19 to the top of member 22; the other end of member 21 is secured to the top of member 23. Members 19–23 thus form a vertical framework held upright by feet 24 and 25. The inclined top member 21 serves as a base for secondary support 12.

Support 12 comprises a long horizontal member 26 and two short vertical members 27 and 28. Member 27 is perpendicularly attached to one end of member 26 and member 28 is perpendicularly attached to the other end of member 26. Member 26 is positioned directly over member 21 of base 11 in parallel relationship therewith and the end of member 26 to which member 28 is attached is pivotally secured to the elevated end of member 21 by means of a hinge 29. Through the action of the hinge 29, member 26 may be permitted to rest driectly upon member 21, or its free end may be raised vertically in a pivoting motion about hinge 29.

Frame 13 comprises a rectangular frame 31, an axle 32 and a sensor mounting bar 33. Axle 32 is secured to the underside of frame 31 along the longitudinal centerline of frame 31 and bar 33 is secured to the top side of frame 31 along the lateral centerline of frame 31. The ends of axle 32 extend somewhat beyond the ends of frame 31 and are rotationally mounted between the upper ends of members 27 and 28 of support 12. Frame 31 is thus rotatable with axle 32 between the upper ends of members 27 and 28. Frame 13 serves as a mounting platform for any of the various types of solar collectors.

Sensor element 14 as shown most clearly in FIG. 4 comprises a printed circuit board 34, a directional light pickup tube 35 and an enclosure 36. Mounted on board 34 are a number of electronic components including a photo-transistor 37. Tube 35 comprising a cylindrical shell has a coaxial inner cylindrical tube 39 mounted to extend within its free end. Tube 39 is considerably shorter in length and smaller in diameter than the shell of tube 35 and is held in a centered position in one end thereof by means of an open-centered insert or plug 41.

The end of tube 39 may extend a short distance beyond the end of tube 35. Enclosure 36 is of a rectangular configuration having board 34 mounted therewithin in parallel relationship with its base 42. The photo-transistor 37 is mounted on the top side of board 34 near its center with tube 35 extending perpendicularly through an opening in the center of the top surface 43 of enclosure 36. Its lower end is arranged to extend to board 34 and envelop the body of photo-transistor 37. When tube 35 is directed toward a light source, rays of light 44 pass through tube 39 and downwardly along the axis of the tube to strike the optically open top surface of photo-transistor 37. As noted from FIG. 1 of the drawing, the sensor element 14 is mounted at the center of bar 33 with the base 42 of enclosure 36 secured to bar 33 and with tube 35 extending perpendicularly upwardly from the center of frame 13.

Actuator motor 16 is secured to the underside of member 19 of base 11, as shown in FIG. 3, and is positioned directly under the free end of support 12 with its rotor 45 coupled to the end of member 26 by means of two interconnected levers 46 and 47. As noted, the free end of lever 46 is secured to rotor 45 and its other end is pivotally connected to a first end of lever 47. The second or free end of lever 47 is pivotally secured to the side of member 26. Motor 16 is designed to turn at the rate of one revolution per minute when energized with the outer end of lever 46 traversing a circle as it is rotated by motor 16. The lower end of lever 47 follows the circular path taken by the end of lever 46 to which it is coupled. The upper end of lever 47 responds by moving up and down along an arc 49 which is centered at hinge 29, its total excursion being equal to twice the length of lever 46 as measured between rotor 45 and pivot pin 51 securing the outer end of lever 46 to the lower end of lever 47. The outer or free end of support 26 is thus moved cyclically up and down with the attached upper end of lever 47 as motor 16 is operated.

Actuating motor 17 is secured to the underside of a horizontal mounting bar 52 which extends perpendicularly from the side of member 26 at a point near the attachment of hinge 29. As shown in FIG. 2, the rotor 53 of motor 17 is coupled to frame 13 by means of two pivotally coupled levers 54 and 55 in a manner identical to that provided by levers 46 and 47 for the coupling of motor 16 to support 12. When motor 17 is energized the outer end of lever 54 traverses a circular path and carries with it the pivotally attached lower end of lever 55. The upper end of lever 55, which is pivotally attached to frame 13, moves responsively up and down causing frame 13 to be cyclically pivoted about axle 32. The outer edge of frame 13 moves up and down along an arc 56 with the length of arc 56 being determined by the length of lever 54 and by the point of attachment 57 of lever 55 to frame 13.

Motor control switch 18 is secured to the top surface of bar 52 at a point near its outer end. As the right hand end of frame 13, as shown in FIG. 2, approaches the low point of its cyclical excursion, its underside comes into physical contact with the plunger of switch 18 causing switch 18 to close. Switch 18 remains closed until the end of frame 13 passes its lowest point and begins its upward motion. The closed condition of switch 18 thus coincides with a period of a few degrees of rotation of motor 17.

Control box 15 is attached to the side of base 11 adjacent member 23 with the electrical and electronic controls of frame 10 accomplished by means of its control circuit 60 shown in more detail in FIG. 5.

Control circuit 60 comprises motors 16 and 17, switch 18, a timer 61, d-c power supply 62, an electronic control circuit 63 and a motor control relay 64.

Timer 61 receives 50 or 60 hertz power from a utility power source through a cord set 65 and delivers the same voltage at timed intervals to a pair of conductors, 66 and 67.

Power supply 62 comprises a step-down transfomer 68, a bridge rectifier 69 and a filer capacitor 71. Transformer 68 has its primary winding 72 connected between lines 66 and 67. Its secondary winding 73 is connected to the a-c terminals 74 and 75 of bridge rectifier 69. Capacitor 71 is connected across the d-c terminals 76 and 77 of rectifier 69. The positive terminal 76 is also connected to the positive supply terminal 78 of circuit 63 and the negative or ground terminal 77 is connected to the ground terminal 79 of circuit 63.

Electronic control circuit 63 comprises the photo-transistor 37, an amplifying transistor 81, a signal relay 82, a base driver resistor 83 and output terminals 84 and 85. Relay 82 has a coil 86 and a set of normally-open contacts 87. Transistor 37 is an NPN photo-transistor and transistor 81 is an NPN bi-polar transistor. The collector (C) of transistor 81 is connected to terminal 78 and its emitter (E) is connected through coil 86 to ground terminal 79. Resistor 83 is connected from the collector to the base (B) of transistor 81. Transistor 37 has its collector (C) connected to its base and its emitter (E) connected to ground terminal 79. One side of contact 87 is connected to output terminal 84 and its other side is connected to terminal 85.

Relay 64 hs a coil 88 and a set of normally-open contacts 89 with coil 88 connected between line 66 and terminal 85 of circuit 63. Terminal 84 of circuit 63 is connected to line 67. Motor 17 is serially connected with contacts 89 of relay 64 across lines 66 and 67, and motor 16 is serially connected with switch 18 across motor 17.

The timer 61, power supply 62 and the realy 64 may be housed in control box 15 with circuit 63 mounted on board 34 of sensor element 14.

In the operation of circuit 60, cord 65 is first connected to an alternating voltage source, typically 120 volts at 60 hertz. Timer 61 is set to turn on at sunrise and to turn off again at sunset so that 120 volts a-c is available across lines 66 and 67 during the period of daylight. Power supply 62 accepts the 120 volts at the primary 72 of transformer 68 and delivers a filtered d-c voltage at terminals 76 and 77, the d-c voltage having an amplitude of approximately 24 volts. If no light rays 44 are striking the junction area of transistor 37, this transistor will exhibit a high impedance between its collector and emitter terminals. Current from terminal 78 flows in this case through resistor 83 into the base of transistor 81 turning transistor 81 on so that current from terminal 78 also flows through transistor 81 and through coil 86 to terminal 79. The excitation of coil 86 causes contacts 87 to close with the result that coil 88 of relay 64 is energized by an a-c current flowing from line 67 through contacts 87 and coil 88 to line 66. With the energizing of coil 88, contacts 89 close connecting motor 17 across lines 66 and 67.

The resulting energization of motor 17 causes frame 13 to rock slowly back and forth about axle 32 as described earlier in an altitude mode. For a brief period during each oscillatory cycle of frame 13 about axle 32, switch 18 is closed causing motor 16 to be energized. During the brief period in which motor 16 is energized, it turns a few degrees at a rate of approximately one-half revolution per minute, thereby raising or lowering support 12 a lesser number of degrees than the movement of frame 13 in an azimuth mode which is in a direction substantially perpendicular to the path of rotation of frame 13. In this manner, the sensor element 14 is caused to sweep the sky moving back and forth from east to west, advancing at the end of each sweeping cycle to a higher or lower elevation until at some point in the sweeping action a ray of light from the sun will be captured by tube 39. The captured ray 44 striking transistor 37 causes transistor 37 to switch to a low impedance state whereupon the current from resistor 83 is by-passed through transistor 37 to ground terminal 79. Thus robbed of base current, transistor 81 turns off, coil 86 is de-energized and contacts 87 open to de-energize relay 64 and motors 16 and 17.

As the sun moves westward, the alignment of sensor element 14 with the sun will be lost with the result that insufficient light 44 strikes transistor 37 to sustain its low impedance condition. As transistor 37 turns off, transistor 81 again turns on to energize relays 82 and 64 and motor 17. If motor 17 has reached the appropriate part of its cycle, frame 13 will begin rotating toward the west and the sun's rays will be recaptured; if an eastward rotation occurs, the frame 13 will be rotated to its eastward limit and will then rotate westward until recapture is achieved. Subsequent directional corrections will progress westward in the desired manner.

It will be recognized that a specific directional orientation of the base 11 is appropriate. In the northern hemisphere the lower or left-hand end of base 11 as shown in FIG. 3 will be directed toward the south. In the winter season the left-hand end of support 12 will have to be lowered to capture the sun; as the season progresses toward summer support 12 will gradually be raised for sustained solar alignment. At the end of each day the timer 61 will turn off power leaving the sensor 14 directed toward the setting sun. At daybreak the timer again energizes circuit 60 causing frame 13 to rock eastward until capture occurs. At the first adjustment the sensor moves eastward past the sun, then returns westward until recapture is achieved. Successive adjustments throughout the day are in an appropriately westward direction. Elevational adjustments occur whenever an east-west sweep fails to achieve capture of the sun. A solar collector mounted on frame 13 is thus appropriately directed at all times toward the sun.

An extremely simple yet functionally effective mechanical and electrical arrangement is thus provided for continually directing a solar collector toward the sun in accordance with the stated objects of the invention, and while but a single embodiment of the invention has been illustrated and described, it will be apparent to those skilled in the art that various changes and modifications may be made therein without departing from the spirit of the invention or from the scope of the appended claims.

What is claimed is:

1. A sun tracking apparatus comprising:

a base, a support pivotally mounted at one end thereof on said base, a collector supporting frame rotatably mounted on said support, said support pivotally moving in a direction substantially perpendicular to the path of rotation of said frame, an optical sensor mounted on said frame, a first motor means actuated by said sensor for rotating said frame on said support to cause the rays of the sun to focus upon said sensor responsive to the altitude of the sun above the horizon, said sensor comprising an elongated hollow tube having a photo-transistor mounted at the base thereof for receiving the sun's rays, a second motor means for pivotally moving said support and said frame on said base for maintaining the rays of the sun on said sensor in an azimuth mode, and a switch mounted on said base and actuated by said frame at a given point during the frame's rotation for actuating said second motor means to pivotally move said support a predetermined amount.

2. The sun tracking apparatus set forth in claim 1 wherein:

said switch is mounted on said base for actuation by said frame at a point near the end of its path of rotation in a given direction.

3. The sun tracking apparatus set forth in claim 1 wherein:

said switch is mounted on the top of said frame.

* * * * *